("12") United States Patent
Hough et al.

(10) Patent No.: US 6,921,486 B2
(45) Date of Patent: Jul. 26, 2005

(54) WASTE ACTIVATED SLUDGE ANAEROBIC CONTACT WASTE STREAM TREATMENT PROCESS

(76) Inventors: Stephen Hough, 9892 Deerhaven Dr., Santa Ana, CA (US) 92705; Balakrishnan Narayanan, 973 Maplegate Ct., Concord, CA (US) 94521

( * ) Notice: Subject to any disclaimer, the term of this patent is extended or adjusted under 35 U.S.C. 154(b) by 28 days.

(21) Appl. No.: 10/295,264

(22) Filed: Nov. 14, 2002

(65) Prior Publication Data

US 2004/0094475 A1 May 20, 2004

(51) Int. Cl.[7] .......................... C02F 3/30; C02F 11/04
(52) U.S. Cl. ................................ 210/605; 210/623
(58) Field of Search ....................... 210/605, 621, 210/622, 623, 630, 625

(56) References Cited

U.S. PATENT DOCUMENTS

| | | | | |
|---|---|---|---|---|
| 3,248,323 A | * | 4/1966 | Albertson | 210/609 |
| 3,677,405 A | * | 7/1972 | Keith, Jr. | 210/774 |
| 4,315,821 A | * | 2/1982 | Climenhage | 210/605 |
| 4,664,804 A | * | 5/1987 | Morper et al. | 210/605 |
| RE32,429 E | * | 6/1987 | Spector | 210/605 |
| 5,599,452 A | | 2/1997 | MacLaren | 210/615 |
| 5,601,719 A | | 2/1997 | Hawkins | 210/605 |
| 5,705,072 A | | 1/1998 | Haase | 210/605 |
| 5,811,009 A | * | 9/1998 | Kos | 210/605 |
| 5,833,856 A | | 11/1998 | Liu | 210/605 |
| 5,989,428 A | | 11/1999 | Goronszy | 210/605 |
| 6,113,788 A | | 9/2000 | Molof | 210/605 |
| 6,163,932 A | * | 12/2000 | Rosen | 210/605 |
| 6,398,957 B1 | | 6/2002 | Mandt | 210/605 |
| 6,423,229 B1 | | 7/2002 | Mao | 210/603 |
| 6,592,762 B2 | * | 7/2003 | Smith | 210/605 |
| 6,709,593 B2 | * | 3/2004 | Lorenz | 210/603 |

FOREIGN PATENT DOCUMENTS

JP 58-146495 * 9/1983

OTHER PUBLICATIONS

B. Narayanan, S.G. Hough, Taking the "Waste" Out of Waste Activated Sludge—New Process Configuration Uses Waste Activated Sludge to Treat Wastewater More Efficiently.

* cited by examiner

Primary Examiner—Fred G. Prince
(74) Attorney, Agent, or Firm—Dennis W. Beech

(57) ABSTRACT

The waste activated sludge anaerobic contact waste stream treatment method and system for treating a waste stream may have an influent waste stream communicated to an anaerobic contact element. A waste activated sludge produced from a second influent waste stream process may be introduced into the anaerobic contact element and mixed with the influent waste stream for processing therein. The anaerobic contact element may be maintained for conditions to facilitate the uptake of soluble organic pollutants and to form a fluid having a particulate matter contained therein. The resulting fluid may have the particulate matter separated from the fluid to produce a treated effluent and a waste sludge.

3 Claims, 1 Drawing Sheet

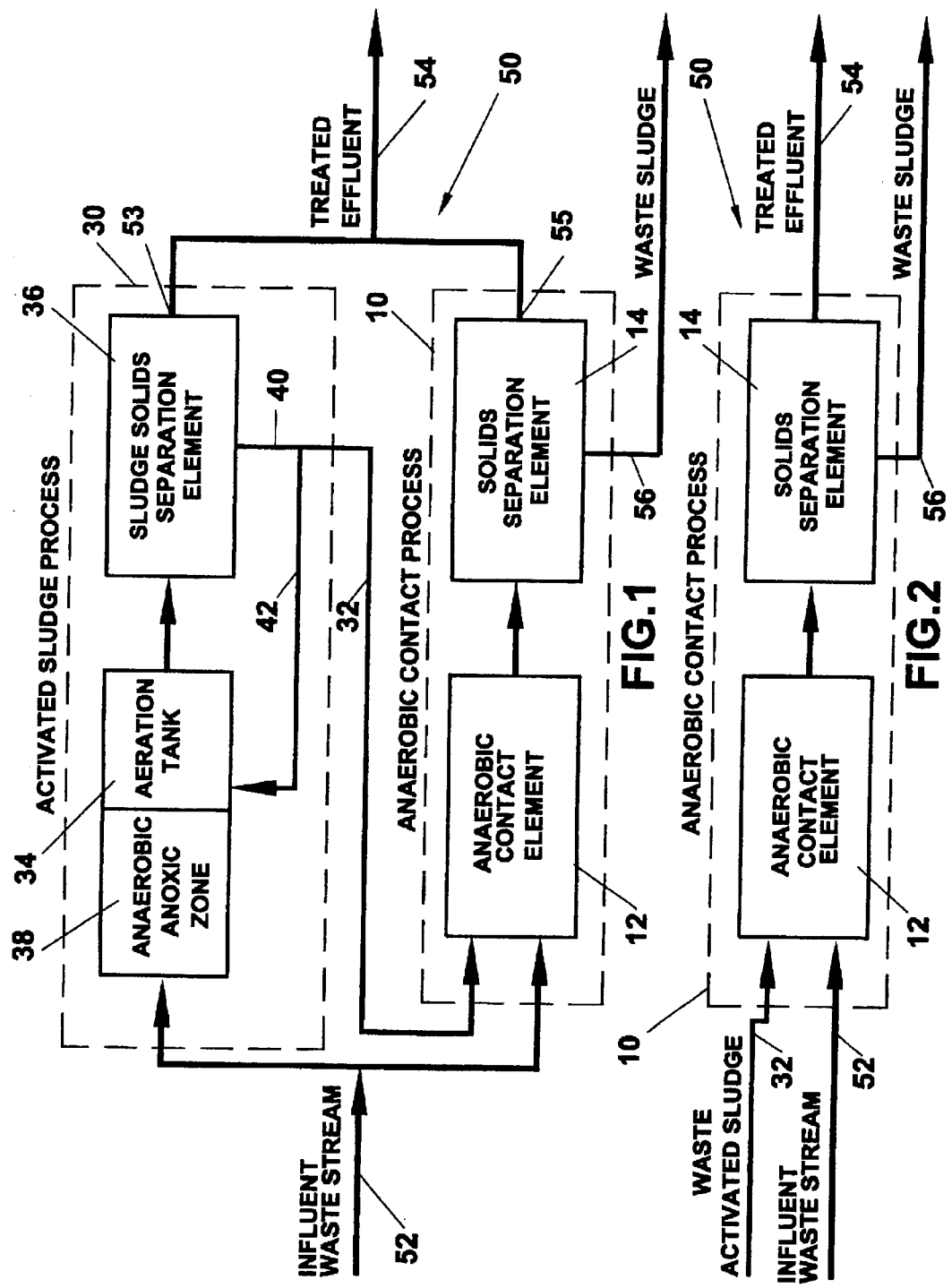

WASTE ACTIVATED SLUDGE ANAEROBIC CONTACT WASTE STREAM TREATMENT PROCESS

BACKGROUND OF THE INVENTION

This invention relates to systems and processes for treatment of a waste stream in a generally biological process for conversion of organic and inorganic pollutants into biomass and other products. The new system and process introduces waste activated sludge into the influent waste stream received by a waste stream treatment system that may be mixed in an anaerobic contact process. The anaerobic contact process may be in fluid communication with a solids separation process for separation of the biomass and particulate matter to produce a treated process effluent.

Activated sludge processes are one of the most commonly used wastewater treatment processes in which organic and inorganic pollutants are converted into particulate biomass suspended in fluid in an aeration process. The particulate biomass may then be separated from the fluid to produce a concentrated activated sludge and an effluent. The concentrated activated sludge may be returned to the aeration process as return activated sludge to be mixed with the waste stream influent. A portion of the concentrated activated sludge may be wasted from the process to maintain an optimal concentration of system biomass. The activated sludge process may require a large energy input as the process may be based on aeration conditions to the extent that the activated sludge process may consume significant energy in a wastewater treatment plant.

The waste activated sludge may be subjected to further treatment and/or disposed. Often waste activated sludge may be processed in an anaerobic digestion process that may produce methane gas. The energy in the methane gas may be captured using boilers or energy systems. This energy may be used to reduce energy supply requirements of the treatment process.

Rather than simply processing the waste activated sludge for disposal, the present invention discloses that the waste activated sludge may be used to process influent wastewater in an anaerobic contact process in combination with the waste activated sludge. To the extent this process is efficient in wastewater treatment it may reduce the aeration energy requirements and thereby the overall wastewater treatment facility energy requirements. The use of the waste activated sludge anaerobic contact process may also reduce the wastewater treatment facility size requirement as well as result in an increased potential for energy recovery through anaerobic digestion due to a higher energy content in the resultant waste sludge.

SUMMARY OF THE INVENTION

The present invention is directed to systems and methods for treating waste stream wherein a source influent waste stream may be transmitted to an anaerobic contact element. A waste activated sludge produced from a second influent waste stream process or a portion of the source influent waste stream may be introduced into the anaerobic contact element and mixed with the influent waste stream for processing therein. The anaerobic contact element may be maintained for conditions to facilitate the uptake of soluble organic pollutants and to form a fluid having a particulate matter contained therein. The resulting fluid may have the particulate matter separated from the fluid to produce a treated effluent and a waste sludge.

These and other features, aspects and advantages of the present invention will become better understood with reference to the following drawings, description and claims.

BRIEF DESCRIPTION OF THE DRAWINGS

FIG. 1 illustrates a functional diagram of an activated sludge process combined with a waste activated sludge anaerobic contact process according to an embodiment of the invention;

FIG. 2 illustrates a functional diagram of a waste activated sludge anaerobic contact process and system according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIG. 1, an activated sludge process 30 is coupled with a waste activated sludge anaerobic contact process 10 for use in a secondary waste stream treatment process. The functional diagram of the activated sludge process 30 is a representation of one such process structure as may be known in the waste stream treatment industry. Other waste activated sludge producing processes may be used in a waste activated sludge anaerobic contact treatment process 50. The treatment process 50 essentially receives an influent waste stream 52 and produces a treated effluent 54 as well as an increased energy waste sludge 56 product. The influent waste stream 52 may be a municipal waste or wastewater, industrial waste, food processing waste, pharmaceutical waste and the like.

The influent waste stream 52 may be split between the anaerobic contact process 10 and the activated sludge process 30 wherein a portion of the waste stream is treated in each process. The activated sludge process 30 may include an anaerobic zone 38 that may be partially anoxic if for example nitrate is present in an aeration tank 34 or basin element that may facilitate the growth of phosphate accumulating organisms. The waste activated sludge 32 produced in the activated sludge process 30 may be sent to the anaerobic contact process 10 to be mixed and processed with the remaining portion of the influent waste stream 52 wherein the introduction of oxygen is minimized. The aerated effluent output 53 and effluent output 55 of the two processes may be combined to produce the treated effluent of a combined process.

Referring to FIG. 2, the anaerobic contact process 10 may receive an influent waste stream 52 and waste activated sludge 32 from a separate source that may be mixed in an anaerobic contact element 12 or tank, basin or the like. The unaerated conditions existing in the anaerobic contact tank 12 may facilitate the uptake of soluble organic pollutants by the waste activated sludge 32. Adsorption of particulate pollutants may also occur.

The anaerobic contact element 12 or process may be in fluid communication with a solids separation process or element 14 that may include secondary clarifiers, membranes, filters and other separation structures as understood in the industry. The anaerobic contact element 12 may be configured as multiple tanks in serial fluid communication. The solids separation process may separate out the particulate matter, leaving an effluent that may be largely free of organic pollutants. Use of this basic configuration may be limited to processes designed for removal of carbonaceous organic pollutants, but may be applicable to the removal of other pollutants.

Referring again to FIG. 1, the anaerobic contact process 10 may be understood by reference to the interaction with an example activated sludge process 30. An activated sludge process of some form or structure may be one of the most commonly used processes in waste stream treatment. An activated sludge process 30 may normally include two main components, an aeration tank 34 or element where biological reactions may occur and a sludge solids separation element 36 or process that may be a separate tank where particulate biomass may be separated from the fluid mixture to produce a concentrated activated sludge effluent 40.

A portion of the separated biomass may be processed as waste activated sludge 32 and the remainder may be returned to the aeration tank 34 as return activated sludge 42. The composition of the biomass in the process or system may be determined by the system configuration and operating conditions. The presence of one or more anaerobic zones 38 in the aeration tank 34 may encourage the growth of phosphate accumulating organisms. The activated sludge process 30 may require aeration to supply the oxygen necessary for biological conversions.

The energy usage associated with activated sludge aeration may be significant. Processing a portion of the influent waste stream 52 with waste activated sludge 32, resulting from processing a second portion of the influent waste stream 52, in an anaerobic contact process 10 may significantly reduce the aeration costs. The biodegradable energy in the influent may be substantially absorbed by the biomass in the waste activated sludge 32.

The absorbed pollutants may not be oxidized, but may be simply stored in the biomass. The waste sludge 56 from the system may have a high energy content that may potentially be recovered through anaerobic digestion. Also, because the waste sludge may be more biodegradable due to less cellular material, there may be less sludge for disposal.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for treating a waste stream, comprising the steps of:
   providing an influent waste stream source to be treated by a treatment system to an anaerobic contact element;
   introducing a waste activated sludge into said anaerobic contact element;
   mixing said influent waste stream source and said waste activated sludge wherein the introduction of oxygen is minimized;
   maintaining conditions in said anaerobic contact tank to facilitate the uptake of soluble organic pollutants to form a fluid having a particulate matter contained therein;
   communicating said fluid from said anaerobic contact element directly into a solids separation element; and
   separating said particulate matter from said fluid to output an effluent and a waste sludge.

2. The method as in claim 1 further comprising the steps of:
   producing said waste activated sludge by processing a portion of said influent waste stream source in an aeration tank;
   maintaining conditions in said aeration tank to facilitate the uptake of soluble organic pollutants using aeration to form an aerated fluid having a particulate matter contained therein;
   communicating said aerated fluid into a sludge solids separation element; and
   separating said particulate matter from said aerated fluid to output an aerated effluent output and said waste activated sludge.

3. The method as in claim 1 wherein a portion of said influent waste stream source is processed in an activated sludge process comprising:
   an aeration tank;
   a sludge solids separation element in communication with said aeration tank;
   a waste activated sludge output and an aerated effluent output; and
   said waste activated sludge output in communication with said aeration tank and said anaerobic contact tank.

* * * * *